United States Patent [19]

Tang et al.

[11] Patent Number: 4,893,244
[45] Date of Patent: Jan. 9, 1990

[54] PREDICTIVE SPARK TIMING METHOD

[75] Inventors: Dah-Lain Tang, Canton; Man-Feng Chang; Myrna C. Sultan, both of Troy, all of Mich.

[73] Assignee: General Motors Corporation, Detroit, Mich.

[21] Appl. No.: 237,021

[22] Filed: Aug. 29, 1988

[51] Int. Cl.⁴ .............................................. F02P 5/15
[52] U.S. Cl. ............................ 364/431.03; 364/431.07; 123/417; 123/416
[58] Field of Search .............. 364/431.03, 565, 431.07; 123/416, 417, 418, 419, 422, 426; 73/116

[56] References Cited

U.S. PATENT DOCUMENTS

| | | | |
|---|---|---|---|
| 3,934,563 | 2/1976 | Muller et al. | 123/416 |
| 4,236,214 | 11/1980 | Sasayama | 364/431.07 |
| 4,351,306 | 9/1982 | Luckman et al. | 123/417 |
| 4,355,613 | 10/1982 | Rode et al. | 123/417 |
| 4,379,333 | 4/1983 | Ninomiya et al. | 364/431.04 |
| 4,424,568 | 11/1984 | Nishimura et al. | 364/431.07 |
| 4,547,852 | 10/1985 | Kamifuji et al. | 364/431.07 |
| 4,548,185 | 10/1985 | Pozniak | 364/431.07 |
| 4,553,426 | 11/1985 | Capurka | 173/116 |
| 4,607,523 | 8/1986 | Takahashi et al. | 73/116 |
| 4,630,206 | 12/1986 | Amamo et al. | 364/431.07 |
| 4,644,917 | 2/1987 | Yakuwa et al. | 123/417 |

Primary Examiner—Parshotam S. Lall
Assistant Examiner—V. Trans
Attorney, Agent, or Firm—Howard N. Conkey

[57] ABSTRACT

A microprocessor based electronic spark control for an internal combustion engine is programmed to determine spark time using a prediction of engine speed during the spark period in which the next spark should occur and to make the calculations immediately prior to that period. The prediction is based upon the most recent speed information including a reference period value just prior to the next spark period. Reference pulses produced from a crankshaft driven transducer determine the measured reference periods and preferably comprise a plurality of pulses per spark event. One reference period is chosen as a base period and a weighted difference of recent periods is used to adjust the base to predict the spark period. The spark period or the corresponding engine speed is used in calculating the spark angle and the conversion to spark time. A hardware interrupt to the microprocessor causes the calculations to be made when the reference pulse nearest the next spark occurs.

7 Claims, 6 Drawing Sheets

PREDICTIVE SPARK TIMING METHOD

FIELD OF THE INVENTION

This invention relates to a method of controlling spark timing and particularly to such a method using a predicted engine speed for calculating the spark time.

BACKGROUND OF THE INVENTION

Electronic controls for automotive internal combustion engines select spark timing for each individual cylinder as calculated from engine speed, mass air flow rate and manifold pressure as the main variables and several less influential factors. The calculation and execution is carried out by a programmed microprocessor having inputs from sensors such as a manifold pressure sensor and a crankshaft position sensor. The crankshaft position sensor is the source of information for each cylinder or cylinder pair position from which spark timing is referenced, as well as engine speed. Speed is determined by measuring the time interval between two reference pulses produced by the position sensor and converting the interval to speed. The speed is used as the basis for the control of the fueling and spark firing of the following cylinders. The U.S. Pat. No. 4,351,306 to Luckman et al is an example of such a system.

The time interval between the reference pulses, known as the reference period, is used to determine the commanded spark advance angle. This commanded spark advance angle is then delivered either by counting the reference pulses (known as position based systems) or by converting it into a count down parameter in time (known as time based systems). The commanded spark advance is not optimal for either system because it is based on the past engine speed, not on the engine speed at the time of firing. This causes one type of spark timing error commonly known as calculation error. For time based systems, the conversion of the spark timing command from crank angle degrees to a time unit using the past average engine speed causes an additional spark timing error, called delivery error. The errors are particularly significant when the engine speed is changing rapidly from one spark firing event to the next. Then the past engine speed, in itself, is not a good indicator of the future speed, especially when the speed measurement is taken in a previous combustion cycle. Large spark timing errors can occur for systems which use only two pulses per engine revolution for four cylinder engines, for example. These large timing errors can cause the engine to stall during engine starting, when a cylinder misfires or when sudden changes in load occur.

A proposal to detect the trend in speed change and modify the measured speed in accordance with the trend is discussed in the U.S. Pat. No. 4,424,568 to Nishimura et al. There, reference pulses are generated at the top dead center of each cylinder for a four cylinder engine. The pulses then are spaced 180° of crankshaft rotation. The speed N is determined for each reference time by an undisclosed method. Then at each reference time the speeds determined for that time and for the previous reference time are used to calculate a predicted speed for two reference periods in the future thereby introducing an opportunity for calculation error. That is, the information used to calculate the predicted speed is least one engine revolution old by the time the speed is utilized. The prediction a expressed in the form $N_5 = N_3 + X(N_3 - N_2)$ where X is a weighting constant. The first term is a base speed and the difference term is a measure of acceleration to adjust for the speed trend. After the spark angle is calculated using the predicted speed, the firing can only be executed by calculating a waiting time interval from a reference pulse which is far from the spark angle, thus introducing the opportunity for a major delivery error.

SUMMARY OF THE INVENTION

It is therefore an object the invention to provide an engine control method determines spark timing using a predicted engine based on the most current available speed measurements. It is another object in such a method to execute spark firing by measuring the spark time from a reference pulse near the desired spark angle. It is a further object in such a method to choose algorithm parameters by taking into account the cyclic pattern of an internal combustion engine.

The invention is carried out by a the method of controlling spark timing for an internal combustion engine having a plurality of cylinders and a spark period for each cylinder in which a spark occurs, comprising the steps of: generating at least one crankshaft position reference pulse for each cylinder event, the reference pulse nearest the next spark being set to occur within the same cylinder event as the next spark, measuring at least two reference periods between recent reference pulses, calculating the spark timing synchronously with crankshaft position by performing the calculation upon receipt of the reference pulse nearest the next spark, predicting the engine speed for the next spark period from at least two reference periods including the most recent reference period, and based on the predicted speed, calculating the spark time measured from the said reference pulse nearest the next spark.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Several spark timing algorithms have been derived using the principles expounded herein, each being tailored to a particular application. The number of cylinders in an engine and the number of reference pulses per spark event are the chief application variables to be addressed. In general, the best results are obtained when three, six or more pulses per spark event are available for use, but even when only one reference pulse is generated major improvements over prior methods have been obtained. These variations will be discussed first for a four cylinder engine and then for six and eight cylinder engines. In each case the reference spark period is predicted which corresponds to a predicted engine speed. It is understood that the calculations may be adjusted to use predicted period instead of predicted speed or vice versa. The ensuing description expresses engine position in terms of crankshaft angle. The angular range beginning at one top dead center (TDC) position and extending to the next TDC is called a cylinder event. Typically, one spark event occurs within each cylinder event and several degrees prior to TDC. Examples of specific algorithms are provided using an empirically determined weighting factor K. This factor K may be assumed to be unity in these examples unless otherwise specified. The value of K must be established by experiment for each engine design.

Figure 1:
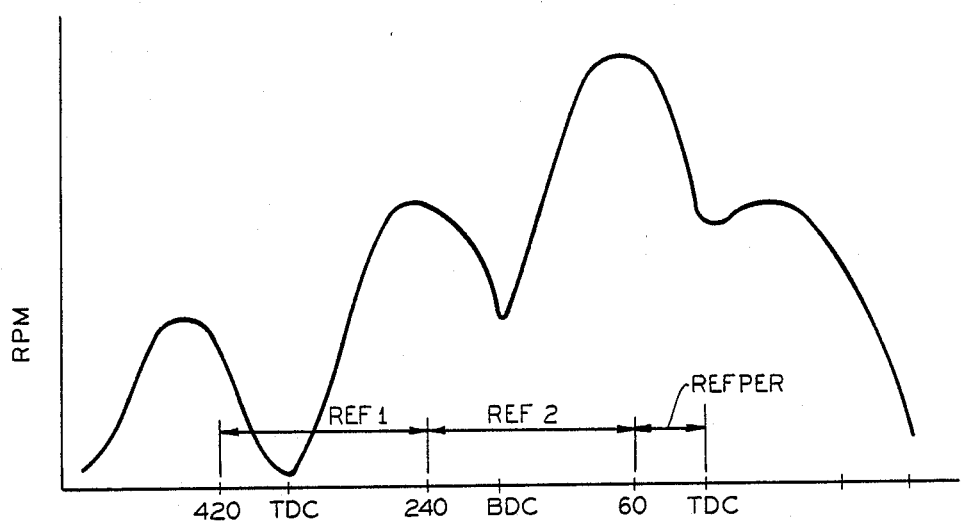
FIG. 1 is a graph showing the variation of engine speed with crank angle and reference periods for a four cylinder engine with one reference pulse per firing event.

FIG. 1 is a graph showing the variation of engine speed with crank angle. The first peak represents the case of steady speed. The next two peaks show the characteristic form of engine acceleration and the last peak shows the effect of misfire. It should be noted that the local low points always occur near the top dead center (TDC) for each cylinder.

FIG. 1 also shows the angular position of reference pulses positioned 60°, 240°, and 420° before TDC to illustrate the case of a four cylinder engine with one reference pulse per spark event. The expected spark angle is between 60° and TDC. It is desired to predict the engine speed for that period, Refper, in order to calculate the spark angle and, after it is calculated, to convert the spark angle to a time period after the 60° point for firing the spark. The 60° period allows sufficient time for the calculations before the spark angle. The unknown period, Refper, is calculated from the latest available data, Ref2, which is the measured time between the pulses at 60° and 240°, and Ref1 which is the measured time between 240° and 420°. Because of the unequal angle ranges, a factor of three is involved. The unknown period is calculated from 3*Refper=Ref2+K*(Ref2−Ref1). The predicted average speed in the spark period is then determined from the interval Refper and is used to calculate spark angle and then spark time after 60°. Thus, if the speed is steady, Ref2=Ref1 and 3*Refper =Ref2. If the engine is accelerating the difference term is negative and decreases the Refper value thereby adjusting the base period or speed in accordance with the trend. While the method gives much improvement over that of the prior art, still greater improvement is possible if the crankshaft position sensor provides a higher resolution signal.

Figure 2:
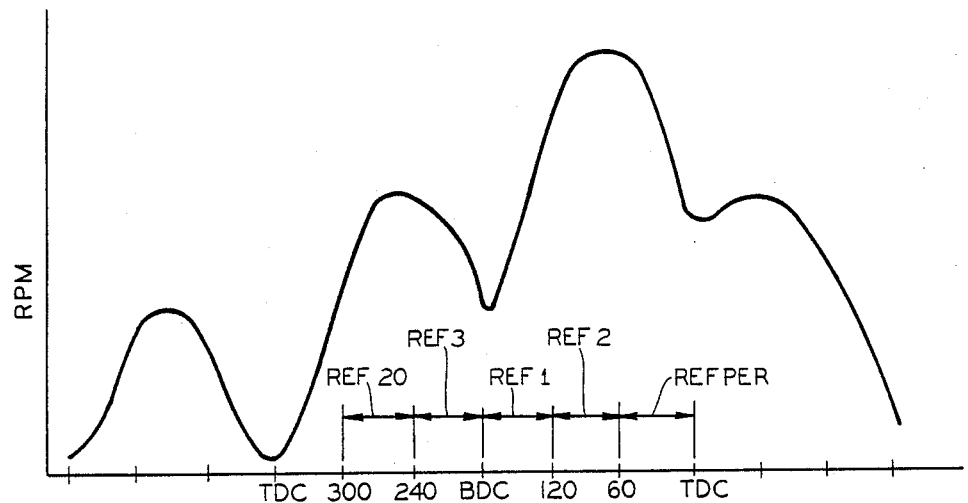
FIG. 2 is a graph showing the variation of engine speed with crank angle and reference periods for a four cylinder engine with three reference pulses per firing event.

FIG. 2 is like FIG. 1 except that three reference pulses per spark event are provided. They occur at TDC and at 60° intervals before that point. Now it is possible to take advantage of the cyclical engine speed behavior; the reference period most like Refper is Ref3 because they both occur just before a local low point of the curve. Thus Ref3 is used as the base period and two other periods spaced by 180° are used to sample the trend. The unknown period is calculated as Refper=Ref3+K*(Ref2−Ref20). For normal combustion K=0.6. When three or more reference pulses are available, engine misfire can be detected by sensing a speed droop in the periods following TDC instead of the normal increase. Thus if Ref1>Ref2 combustion is normal but if Ref1<Ref2 there is a misfire. In case of a misfire the factor K is set at 1.3.

In the case of a six cylinder engine with one pulse per spark event the reference pulses occur at 60° and 120° intervals before that point. Otherwise it is quite similar to the equivalent four cylinder case. The spark period is calculated from 2*Refper=Ref2+K*(Ref−Ref1) where Ref2 is the most recent period and Ref1 is the period preceding Ref2, as in FIG. 1.

Figure 3:
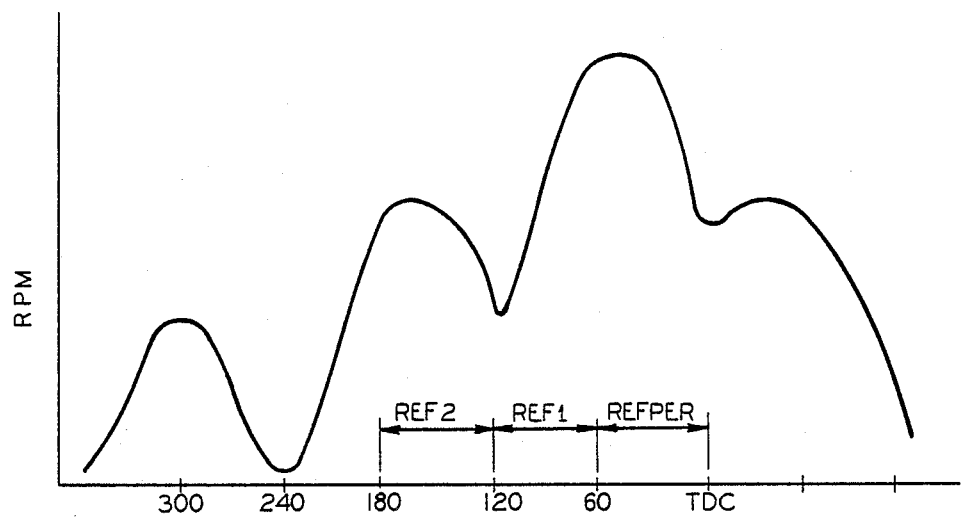
FIG. 3 is a graph showing the variation of engine speed with crank angle and reference periods for a six cylinder engine with two reference pulses per firing event.

FIG. 3 shows the engine speed graph for a six cylinder engine with two pulses per spark event. The pulses are spaced 60° apart starting with TDC and Refper=Ref1+K*(Ref1−Ref2).

Figure 4:
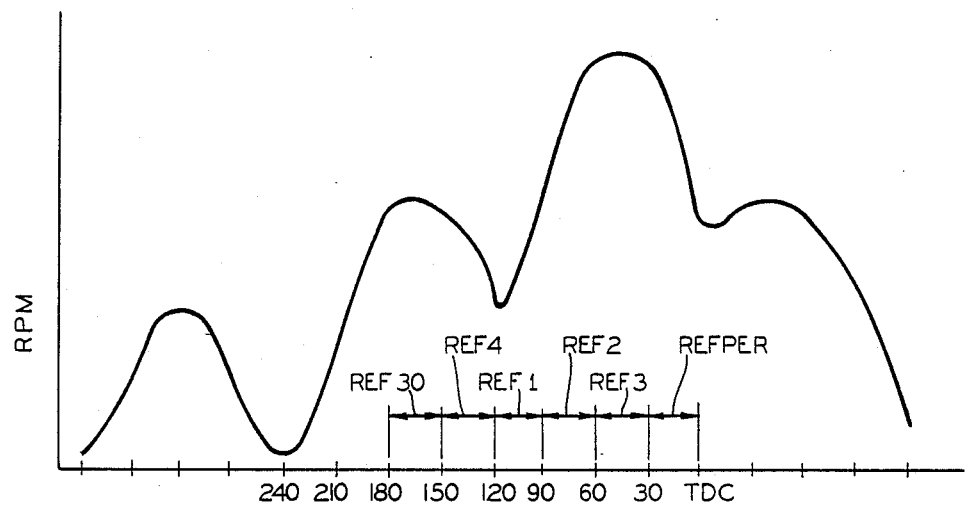
FIG. 4 is a graph showing the variation of engine speed with crank angle and reference periods for a six cylinder engine with four reference pulses per firing event.

The graph for a six cylinder engine with four pulses per spark event is shown in FIG. 4. Here the reference pulses are 30° apart and Refper, as shown, is between TDC and 30°. It is not, however, known in advance that the spark angle is less than 30°. Initially it is assumed that the spark angle SA is greater than 30° and the spark angle calculations are made for Refper=Ref2. If that calculation yields SA>30° the spark firing proceeds on that basis. On the other hand, if SA<30°, two other formulas are used for the cases of misfire or normal combustion which are recognized by Ref1<Ref2 or Ref1>Ref2, respectively. For the normal case the Refper=Ref4+K*(Ref3−Ref30) where K=0.6. For the misfire case Refper=Ref3+K*(Ref3−Ref2) and K=1.

An eight cylinder engine with two pulses per spark event has the pulses spaced 45° starting at 10° before TDC. The unknown period is calculated from the two immediately preceding periods so that Refper=Ref1+K*(Ref1−Ref2).

The general rule for the algorithms is that (1) they are synchronous with engine firing events, i.e., the spark timing function is calculated at the position of the latest reference pulse before the next spark firing is to occur; (2) the latest reference pulse is positioned just prior to the angular range where the spark will occur plus an additional angle to afford calculation time; (3) when pulse resolution permits, more than one latest "reference pulse" is provided and the pulse nearest TDC that includes the spark angle is selected; (4) the most recent measured reference period (adjacent the latest reference pulse) is used in the calculation of Refper; (5) an empirically determined weighted difference of the past reference periods is used in the calculation of Refper; (6) when one or two pulses per spark event are produced the latest reference period is used as the base period and the weighted difference of the last two periods is used to establish the trend and afford an adjustment factor; (7) when more than one pulse per spark event is produced, Refper is calculated from reference periods within the angular range of two cylinder events, where a cylinder event extends from one TDC and the next adjacent TDC; (8) when six or more pulses per spark event are produced, Refper is calculated from reference periods within the same cylinder event as the next spark; and (9) when three or more pulses per spark event are produced relative period sizes are examined to detect misfire and special calculation is used for spark angle in the case of misfire.

Figure 5:
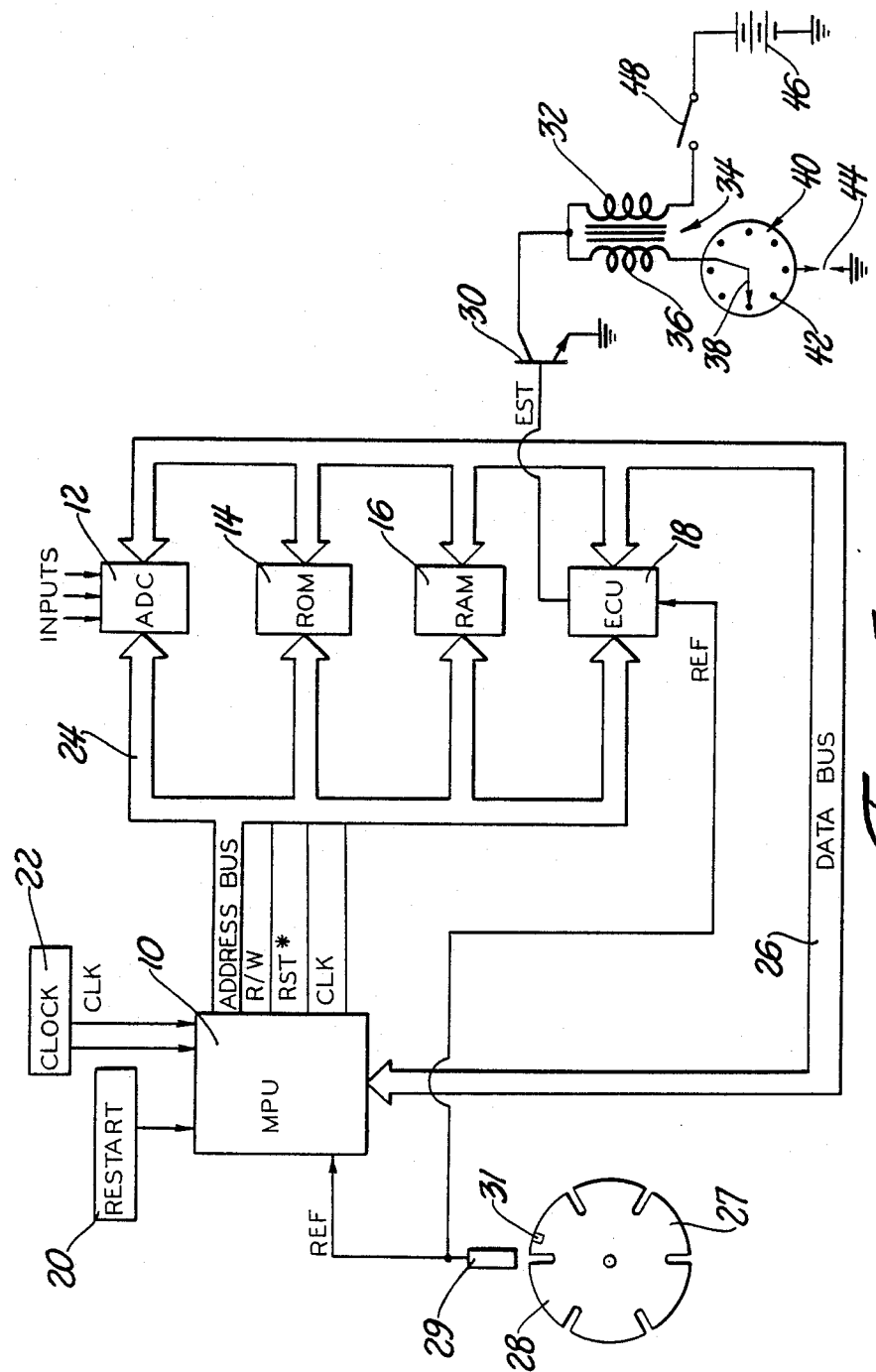
FIG. 5 is a schematic diagram of an electronic ignition system for carrying out the method of the invention.

An apparatus for carrying out the calculations and implementing the control commands is shown in FIG. 5 and is similar to that of the U.S. Pat. No. 4,351,306 to Luckman et al which is incorporated herein by reference and may be referred to for apparatus details not given here. The electronic ignition system includes a microprocessing unit (MPU) 10, an analog-to-digital converter (ADC) 12, a read-only memory (ROM) 14, a random access memory (RAM) 16 and an engine control unit (ECU) 18. The MPU 10 may be a microprocessor model MC-6800 manufactured by Motorola Semiconductor Products, Inc., Phoenix, Arizona. The MPU 10 receives inputs from a restart circuit 20 and generates a restart signal RST* for initializing the remaining components of the system. The MPU 10 also provides an R/W signal to control the direction of data exchange and a clock signal CLK to the rest of the system. The MPU 10 communicates with the rest of the system via a 16 bit address bus 24 and an 8 bit bi-directional data bus 26.

The ROM 14 contains the program steps for operating the MPU 10, the engine calibration parameters for determining the appropriate ignition dwell time and also contains ignition timing data in lookup tables which identify as a function of predicted engine speed and other engine parameters the desired spark angle relative to a reference pulse. The MPU 10 may be programmed in a known manner to interpolate between the data at different entry points if desired. Based on predicted engine speed, the spark angle is converted to time relative to the latest reference pulse producing the desired spark angle. The control words specifying a desired dwell time and spark time relative to engine position reference pulses are periodically transferred by the MPU 10 to the ECU 18 for generating an electronic spark timing (EST) output signal. The ECU 18 also receives the input reference pulses (REF) from a reference pulse generator 27 which comprises a slotted ferrous disc 28 driven by the engine crankshaft and a variable reluctance magnetic pickup 29. In the illustrated example the slots produce six pulses per crankshaft revolution or three pulses per spark event for a four cylinder engine. One extra slot 31 produces a synchronizing signal used in cylinder identification. A vital difference between this apparatus and that in the Luckman et al patent is that the reference pulses are also directed to the MPU 10 to provide hardware interrupts for synchronizing the spark timing calculations to the engine position.

The EST output signal of the ECU 18 is coupled to a switching transistor 30 connected with the primary winding 32 of an ignition coil 34. The secondary winding 36 of the ignition coil 34 is connected to the rotor contact 38 of a distributor generally designated 40 which sequentially connects contacts 42 on the distributor cap to respective spark plugs, one of which is illustrated by the reference numeral 44. Of course the distributor function can be accomplished by an electronic circuit, if desired. The primary winding 32 is connected to the positive side of the vehicle battery 46 through an ignition switch 48.

Figure 6A:
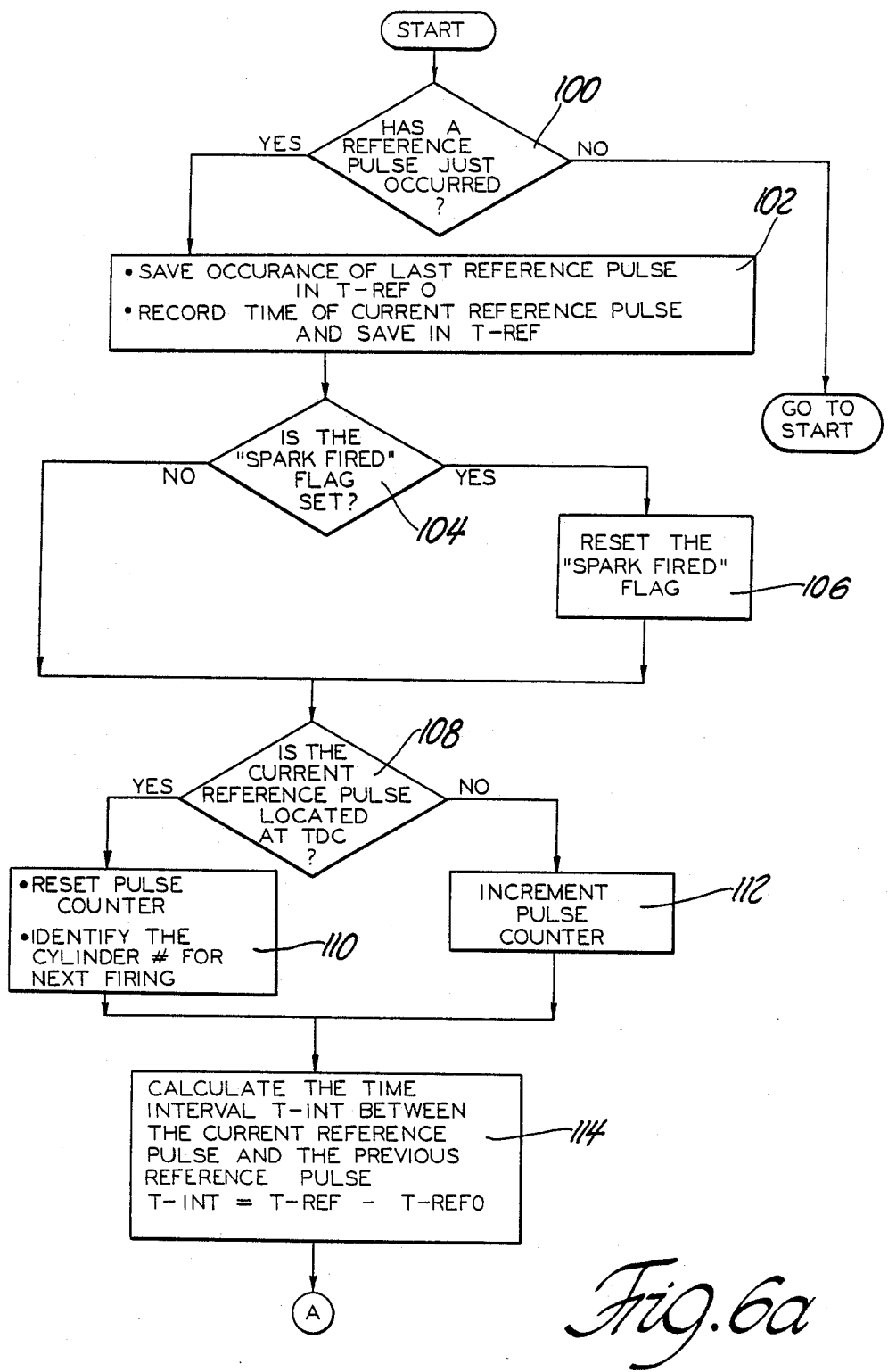
FIGS. 6a, 6b and 6c together comprise a flow chart of a typical control algorithm according to the invention.
Figure 6B:
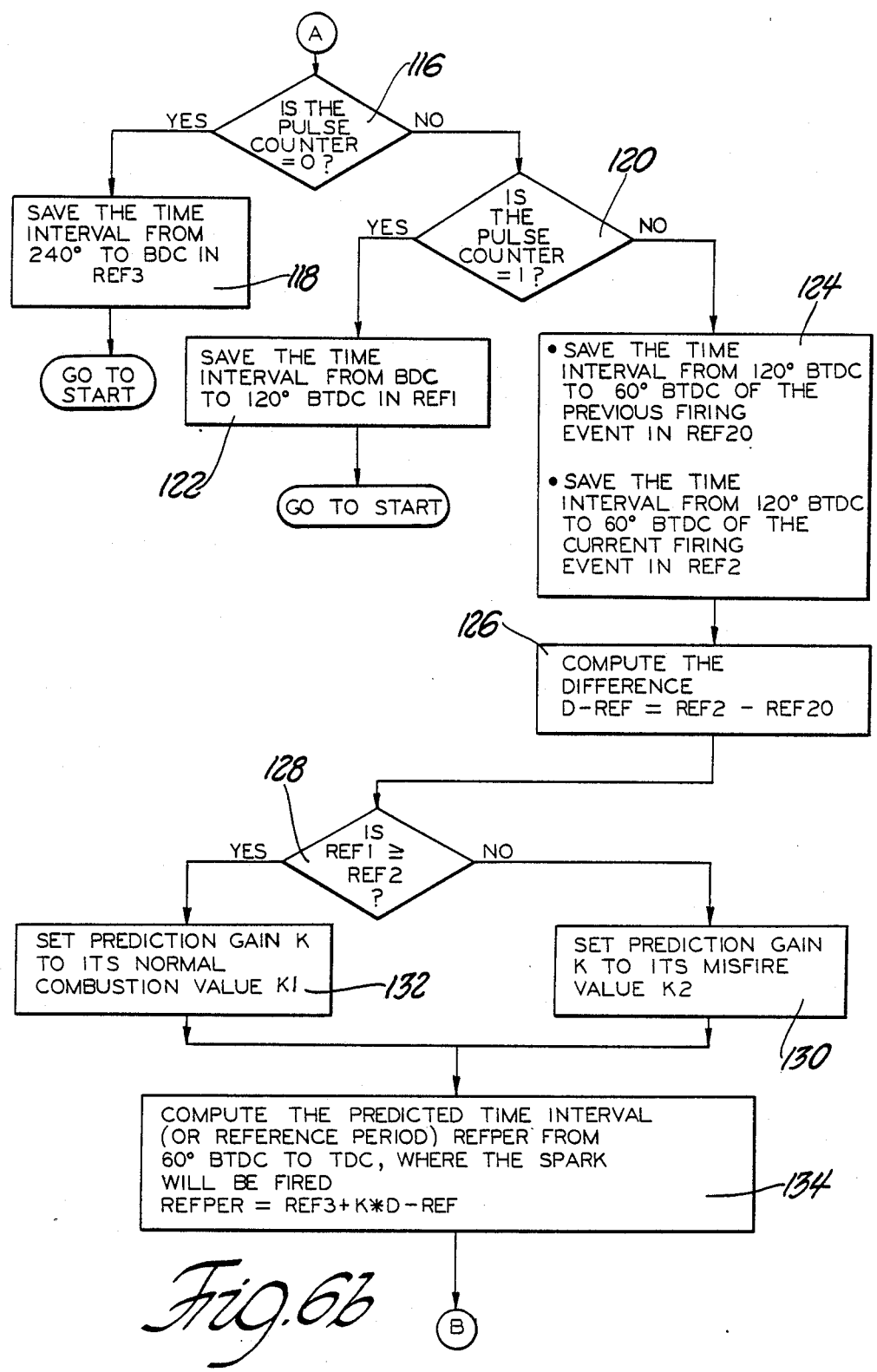
Figure 6C:
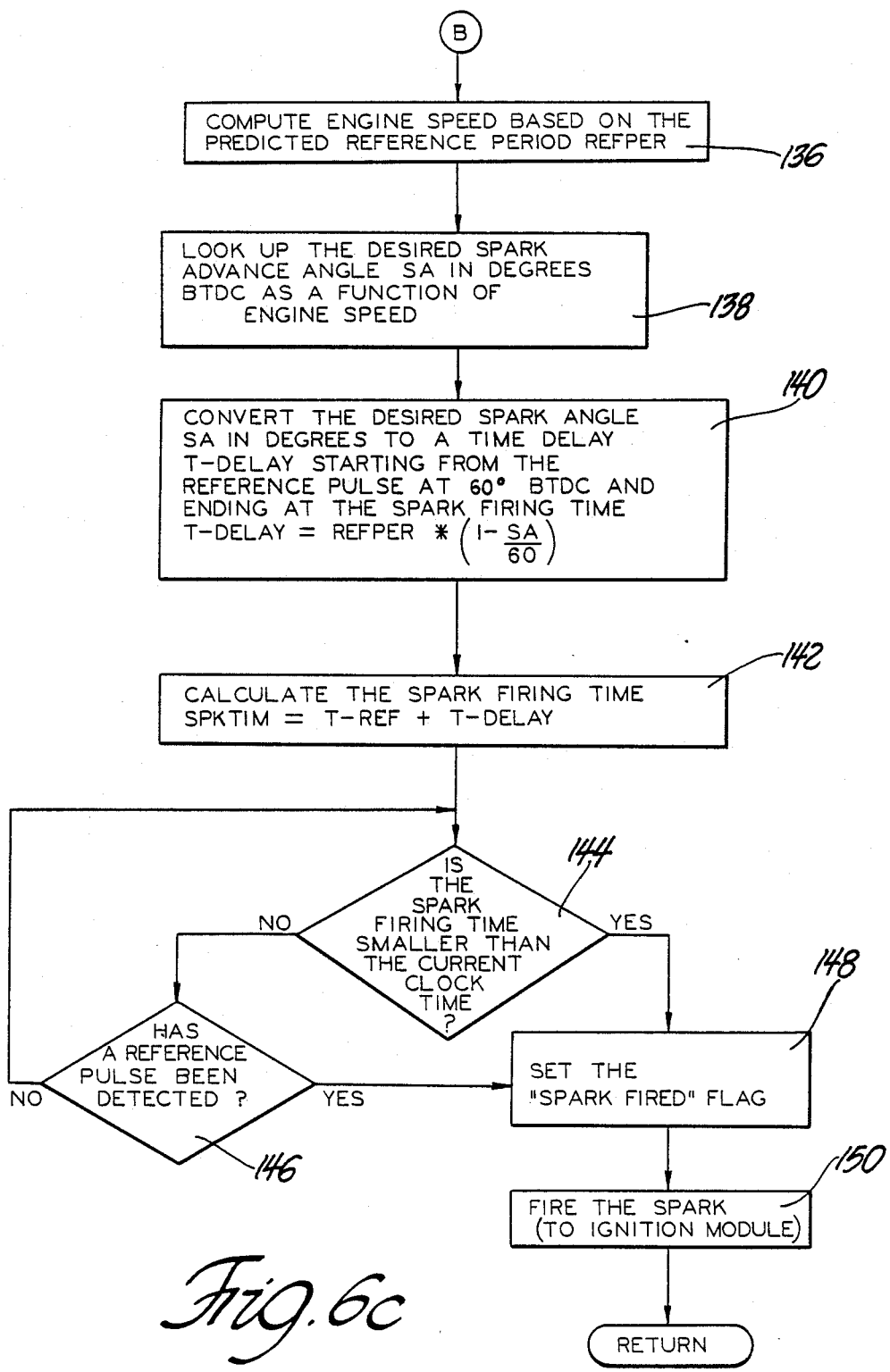

A flow chart of a typical control algorithm according to the invention is displayed in FIGS. 6a, 6b and 6c and indicates the portion of the program embodied in the ROM 14 for spark angle determination and conversion to a time interval. The description of the program includes reference numerals in angle brackets which refer to the flow chart blocks corresponding to the described steps. The three Figures are connected as indicated by the circled letters A and B. This illustrative program is for a four cylinder engine with three reference pulses per spark event.

At the beginning (START) of the program the MPU is instructed to look for a reference pulse REF <100>. This assures that the program runs only at specified crankshaft positions and thus is synchronous with the engine. When a reference pulse is detected the time of the previous pulse is stored in T-ref0 and the time of the current pulse is stored in T-ref<102>. A "spark fired" flag is checked <104> and if it is already set it is then reset <106>. The current pulse position is checked <108> and if it is at TDC the pulse counter is reset and the cylinder to be fired next is identified <110>. If it is not at TDC the pulse counter is incremented <112>. Then the time interval T-int between the current pulse and the previous pulse is calculated <114> to provide the measure of one of the reference periods (Ref1, Ref2, etc.). Next the several reference periods are stored in assigned locations for use in the calculation of the predicted reference period. The pulse counter is compared to zero <116>, and if it is zero the last measured time interval was from 240° to BDC (using the notation of Fig. 2) and it is stored in Ref3 <118> and the program returns to START. If it is not zero the count is compared to one <120>. If it is one the last time interval was between BDC and 120° and it is saved in Ref1<122>. If it is not one the previous value stored in Ref2 is transferred to Ref20 and the current time interval is stored in Ref2 <124> and the difference D-ref between Ref2 and Ref20 is computed <126>. Then misfire is detected by comparing Ref1 and Ref2<128>. If Ref1 is smaller a misfire has occurred and the value of the prediction gain K is set to a preset value K2<130>. If Ref1 is equal to or larger than Ref2 there was normal combustion and K is set to K1<132>. Then the predicted reference period Refper between 60° BTDC and TDC is calculated from Ref3 and D-ref<134>. Then the predicted engine speed is calculated from Refper <136>, the spark advance is found in a lookup table <138>, and the time delay T-delay is calculated from the spark angle and Refper <140>. The absolute spark time is calculated from the time T-ref that the latest reference pulse occurred and the time delay <142>. Finally the spark firing is executed by waiting for clock time to arrive at the calculated spark firing time <144>. When the time does arrive or another reference pulse is detected <146> the "spark fired" flag is set <148> and a spark fire command is issued <150>. The step of detecting another reference pulse is a safeguard to assure a spark in the event of a miscalculation which gives rise to a spark firing time which is much too large.

It will thus be seen that the method of the invention provides an improved spark timing control by making the timing calculation as late as possible prior to the spark time and using the most recent engine speed information for predicting the speed or spark period for the next spark.

The embodiments of the invention in which an exclusive property or privilege is claimed are defined as follows:

1. A method of determining spark time in a spark timing system of an internal combustion engine having a plurality of cylinders and a spark period for each cylinder in which a spark occurs, comprising the steps of:

generating at least one crankshaft position reference pulse for each spark firing event, the reference pulse nearest the next spark being set to occur within a same cylinder event as the next spark;

measuring at least two reference periods between recent reference pulses;

calculating the spark timing synchronously with crankshaft position by performing the calculation upon receipt of the reference pulse nearest the next spark;

predicting the engine speed for the next spark period from at least two reference periods including the most recent reference period; and based on the predicted speed, calculating a spark time measured from the said reference pulse nearest the next spark.

2. A method of determining spark time in a spark timing system of an internal combustion engine having a plurality of cylinders and a spark period for each cylinder in which a spark occurs, comprising the steps of:

generating at least one crankshaft position reference pulse per engine spark firing event, the reference pulse nearest the next spark being set to occur within a same cylinder event as the next spark and prior to the next spark period by an amount sufficient to calculate the spark time;

measuring at least two reference periods between recent reference pulses;

calculating the spark timing synchronously with crankshaft position by performing the calculation upon receipt of the reference pulse nearest the next spark;

predicting the engine speed for the next spark period from at least two reference periods including the most recent reference period;

calculating the desired spark angle based on the predicted engine speed; and based on the predicted speed, converting the desired spark angle to a spark time measured from the said reference pulse nearest the next spark.

3. The invention as defined in claim 2 wherein the said reference pulse nearest the next spark occurs within about 60 degrees before top dead center.

4. The invention as defined in claim 2 wherein the reference periods used in the engine speed predicting step all occur within an interval less than two events.

5. A method of determining spark time in a spark timing system of an internal combustion engine having a plurality of cylinders and a spark period for each cylinder in which a spark occurs, comprising the steps of:

generating a plurality of crankshaft position reference pulses per engine spark firing event, the reference pulse nearest the next spark being set to occur within a same cylinder event as the next spark and prior to the next spark period by an amount sufficient to calculate the spark time;

measuring at least two reference periods between reference pulses within the said cylinder event;

calculating the spark timing synchronously with crankshaft position by performing the calculation upon receipt of the reference pulse nearest the next spark;

predicting the engine speed for the next spark period from a plurality of reference periods including the most recent reference period by selecting one reference period as a base period, determining a speed trend, and adjusting the base period in accordance with the trend;

calculating the desired spark angle based on the predicted engine speed; and based on the predicted speed, converting the desired spark angle to a spark time measured from the said reference pulse nearest the next spark.

6. The invention as defined in claim 5 wherein an acceleration trend is determined as the difference between two reference periods and the engine speed is predicted as the most recent reference period adjusted in accordance with the trend.

7. The invention as defined in claim 5 wherein misfire is detected by comparing reference periods following a spark period to determine whether speed increase typical of combustion occurred, and using the misfire information in predicting the engine speed for the next spark period.

* * * * *